Sept. 3, 1957     B. J. D. HUPFIELD     2,804,649
PLASTIC MOULDING MACHINES
Filed May 31, 1955                                           2 Sheets-Sheet 1
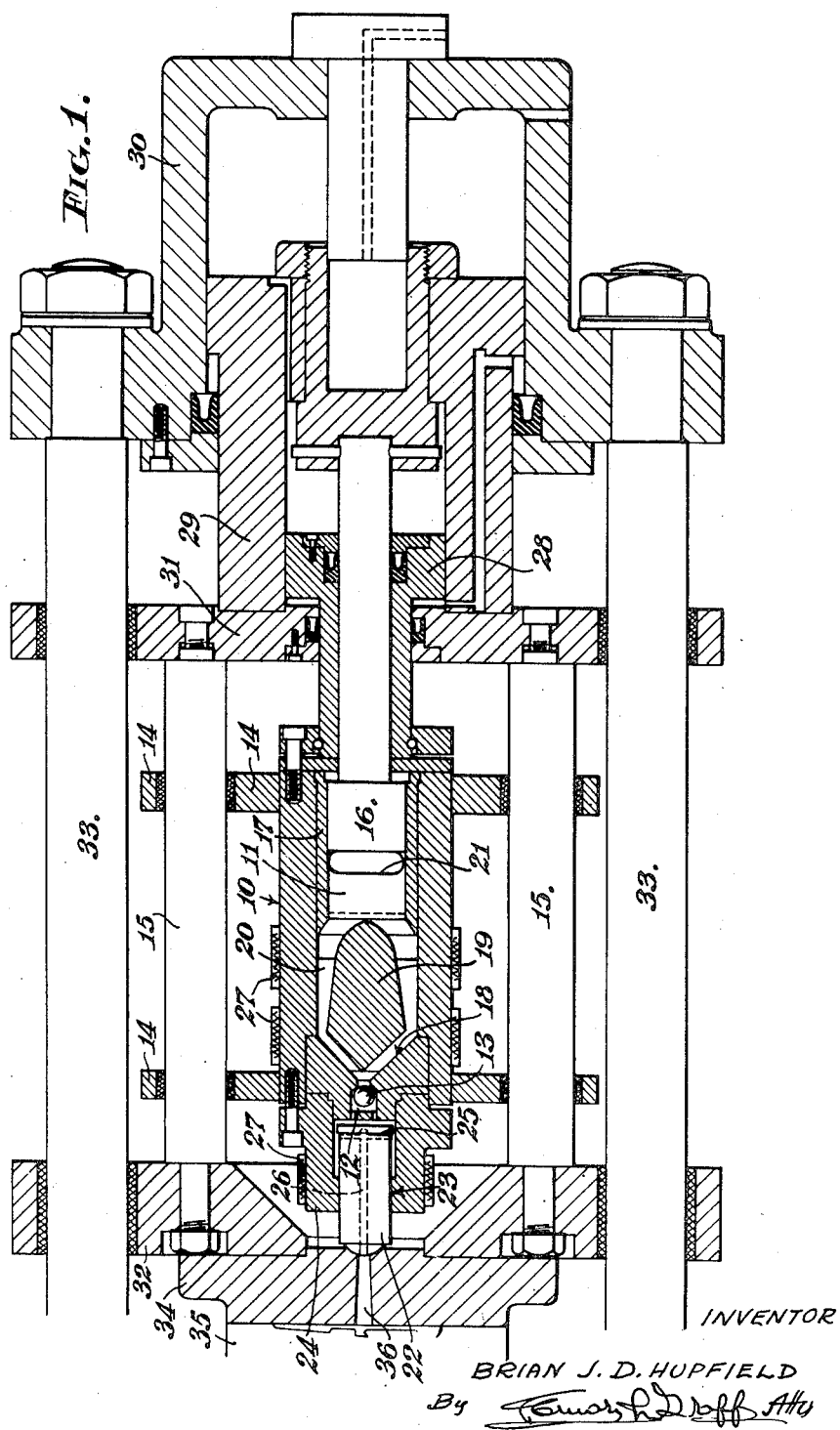
INVENTOR
BRIAN J. D. HUPFIELD Sept. 3, 1957    B. J. D. HUPFIELD    2,804,649
PLASTIC MOULDING MACHINES
Filed May 31, 1955    2 Sheets-Sheet 2
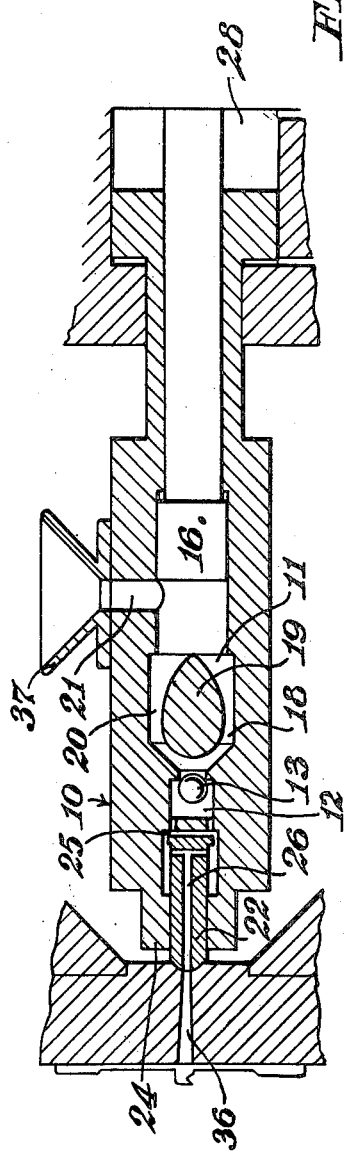
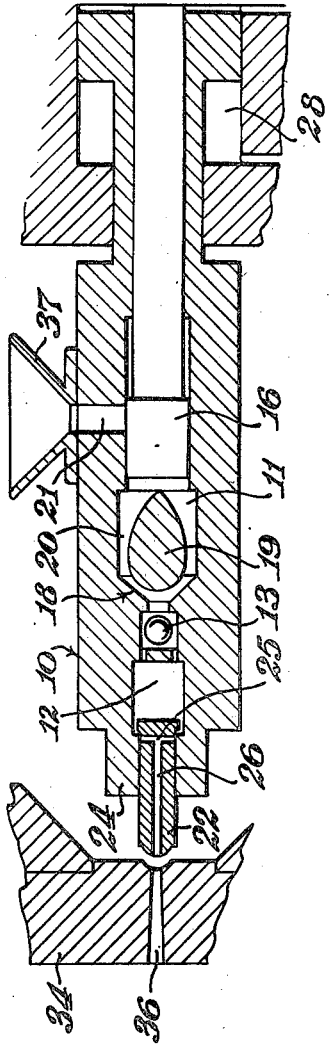
INVENTOR
BRIAN J. D. HUPFIELD
By 2,804,649
Patented Sept. 3, 1957

2,804,649

PLASTIC MOULDING MACHINES

Brian John Desmond Hupfield, Edgware, England

Application May 31, 1955, Serial No. 512,071

4 Claims. (Cl. 18—30)

This invention relates to plastic moulding machines.

A common form of plastic moulding machine comprises a heating cylinder from which the moulding composition, which has been heated to bring it to a molten or plastic condition, is forced by means of a ram reciprocable in said cylinder through an injection nozzle into the mould. The return movement of the ram is wasted.

The invention has among its objects to provide a plastic moulding machine wherein the heating cylinder is adapted to function as a pre-heating chamber on the return stroke of the parts after the injection stroke.

According to the invention, a plastic moulding machine comprises a heating cylinder which is reciprocatable with respect to a fixed ram, said cylinder comprising a rear portion constituting a pre-filling and pre-heating chamber from which molten or plastic moulding material may be forced to a front portion constituting a forward heating chamber, and an injection nozzle which is reciprocatably mounted in the forward heating chamber, the forward movement of said heating cylinder forcing molten moulding material through said nozzle into the mould, and allowing a charge of powdered or granular moulding material to enter the pre-filling and pre-heating chamber, and the return movement of said cylinder forcing pre-heating moulding material from the pre-filling and pre-heating chamber into the forward heating chamber.

The two portions of the heating cylinder are conveniently connected by a non-return valve permitting moulding material to flow from the pre-filling and pre-heating chamber to the forward heating chamber but preventing the reverse flow.

In order to effect efficient pre-heating of the moulding charge before it is forced into the forward heating chamber, that portion of the pre-filling and preheating chamber which is not swept over the piston is of annular form so that the moulding material is held therein in the form of thin annular streams.

It will be appreciated that the various parts of the moulding machine above described may be mounted and assembled in any convenient manner depending upon the particular construction of the injection moulding machine to which the invention is applied, and that any suitable means may be employed to effect reciprocation of the heating cylinder.

One embodiment of the invention will now be described by way of example with reference to the accompanying drawings, wherein:

Figure 1 is a sectional plan view, and

Figures 2 and 3 are diagrammatic views illustrating the operation of the machine.

Referring first to Figure 1, the heating cylinder 10 comprises a comparatively long rear portion forming a rear chamber 11 and a comparatively short front portion 12 of reduced cross-sectional area forming a front chamber, the two portions being connected by way of a non-return valve 13 which permits flow only from the rear to the front chamber. The cylinder 10 is carried by platens 14 which are slidably mounted on pressure rods 15 and is adapted to be reciprocated with respect to a fixed ram 16 which makes a close sliding fit in the rear chamber 11 of the cylinder, the extent of movement of the cylinder being such that the ram moves relatively over approximately the rear half of the rear chamber 11, the cylinder conveniently being provided with a liner 17 where it is in sliding contact with the ram. The forward half of the rear chamber 11 of the cylinder which is not engaged by the ram 16 is conically tapered at its forward end as indicated at 18 and has located therein a torpedo-shaped distributing core member 19 whereby there are constituted annular passages 20 between the relatively foremost position of the ram and the non-return valve 13. Raw moulding material in powdered or granular form is fed into the heating cylinder 10 from a hopper 37) Figs. 2 and 3), through an inlet opening 21 in the wall of the cylinder immediately in front of the ram 16 in its relatively retracted position.

In the front chamber 12 of the heating cylinder there is located an injection nozzle 22 which slides within an aperture 23 in the front end wall 24 of the cylinder so that it acts as a ram when the heating cylinder is reciprocated. At its inner end, the nozzle is formed with a transverse bore 25 which places the longitudinal bore 26 in communication with the front chamber of the heating cylinder after the outlet end of the nozzle engages with the fixed mould member 34 and 26 and 36 are in registry.

The heating cylinder is provided with suitable heating means conveniently consisting of electrical heating bands 27 disposed around the cylinder.

Any convenient means may be provided to reciprocate the heating cylinder, such as a hydraulically-operated piston.

Thus, as shown, the cylinder 10 is rigidly connected to a piston 28 which moves in a prime mover cylinder 29 which is itself constituted as a piston movable in an outer cylinder 30. The piston 28 is rigidly connected to a rear platen 31 which is in turn connected to a front platen 32 by the rods 15, the platens 31 and 32 being slidably mounted on main tie rods 33. The reciprocation of the piston 29 is for the purpose of opening and closing the moulds 34 and 35.

The hydraulic system for the reciprocation of the pistons 28 and 29 is shown diagrammatically, but it will be understood that such system is well known and forms no part of the present invention.

The operation of the machine will now be described with reference to Figures 1 and 2.

On the forward movement or stroke of the cylinder 10 (as shown in Figure 2), the injection nozzle 22 having bore 26 is forced into contact with the fixed mould 34 so that the bore 26 registers with injection hole 36. The nozzle 22 is forced back into the front chamber 12 of the heating cylinder whereby heated moulding material is forced through the nozzle and into the mould, the non-return valve 13 closing to prevent material from flowing back into the rear portion 11 of the heating cylinder. At the same time, the raw material filling opening 21 is uncovered and moulding material flows from the hopper 37 into the rear portion 11 of the heating cylinder to constitute a fresh moulding charge. On the rearward movement or stroke of the heating cylinder (as shown in Figure 3), the filling opening 21 is closed by the ram 16, which forces moulding material from the rear into the front portion of the heating cylinder through the non-return valve 13, at the same time forcing the injection nozzle 22 to the end of the heating cylinder ready for the next injection into the mould.

A moulding machine according to the present invention is simpler and cheaper to manufacture, and gives a faster moulding cycle with a lower injection and locking pressure.

I claim:

1. A plastic moulding machine, comprising, a relatively fixed mould having an injection hole, a fixed ram, a heating cylinder receiving said ram and reciprocatable with respect thereto, said cylinder having a rear pre-filling and pre-heating chamber provided with a raw moulding material inlet controlled by the relative movement of the cylinder with respect to said ram and a forward heating chamber into which heated flowable plastic moulding material may be forced by the ram from said rear chamber, a non-return valve between said front and rear chambers permitting moulding material to flow from the rear chamber to the front chamber, means for supplying raw moulding material to said inlet, and an injection nozzle having a bore and reciprocatably mounted in said front chamber to engage the fixed mould with its bore in registry with said injection hole, the forward stroke of said heating cylinder with respect to said ram forcing molten moulding material from said front chamber through said valve and nozzle as the latter abuts said mould and simultaneously establishing communication between said means for supplying raw material to said inlet to permit the raw moulding material to enter said rear chamber and the return stroke of said cylinder forcing pre-heated moulding material from said rear chamber into said front chamber through said valve.

2. A plastic moulding machine, comprising, a relatively fixed mould having an injection hole, a reciprocating heating cylinder having a front heating chamber and a rear pre-filling and pre-heating chamber provided with a raw material inlet, a fixed ram in said rear chamber and controlling said inlet as the cylinder moves relative thereto, a non-return valve between said front and rear chambers permitting moulding material to flow from the rear chamber to the front chamber, means for heating said front and rear chambers, a distributing core member located in the fore part of said rear chamber adjacent to said valve, means for supplying powdered moulding material to said inlet, and an injection nozzle having a bore and slidably mounted to reciprocate in said front chamber, the forward stroke of said heating cylinder with respect to said ram forcing molten moulding material from said front chamber through the bore of said nozzle when the latter engages said fixed mould and its bore registers with the injection hole of said fixed mould, such forward stroke also opening said inlet to permit a charge of powdered moulding material to enter the rear chamber, and the return backward stroke of said cylinder forcing pre-heated moulding material from the said rear chamber into said front chamber through said valve, said backward stroke causing said pre-heated moulding material to project the injecting nozzle to a position to close the forward end of the front chamber until the exposed end of the nozzle again engages the fixed mould with the bore and injection hole in registry.

3. A plastic moulding machine, comprising, a relatively fixed mould having an injection hole, a reciprocating heating cylinder having a front heating chamber and a rear pre-filling and pre-heating chamber provided with a raw material inlet, a fixed ram in said rear chamber and controlling said inlet as the cylinder moves relative thereto, a non-return valve between said front and rear chambers, permitting moulding material to flow from the rear chamber to the front chmaber, means for heating said front and rear chambers, a distributing core member located in the front part of said rear chamber adjacent to valve, means for supplying powdered moulding material to said inlet, and an injection nozzle slidably mounted to reciprocate in said front chamber, said nozzle being formed with a longitudinal bore opening into the front end of the nozzle and terminating short of the rear end thereof and also formed with a transverse bore placing the rear end of said longitudinal bore into communication with said front chamber, the forward movement of said heating cylinder with respect to said ram forcing molten moulding material from said front chamber through the bore of said nozzle when the latter abuts said mould, said forward movement also simultaneously permitting a charge of powdered moulding material to enter said rear chamber, the backward movement of said cylinder due to pre-heated moulding material in the front chamber moving said nozzle to close the transverse bore as said nozzle reaches the said limit of projection from the front end of said cylinder and prior to the nozzle engaging the fixed mold.

4. A plastic moulding machine, comprising, a fixed mould, a fixed ram, a heating cylinder slidably mounted to reciprocate with respect to said ram and operating in a rear chamber of said cylinder, said cylinder also having a front chamber in valved communication with the rear chamber, a nozzle slidable in the front chamber, a single hydraulically operated piston for reciprocating said cylinder, said cylinder having an inlet opening in the rear chamber for receiving raw moulding material, said inlet opened and closed by the relative movement of the cylinder relative to the ram, and means for heating said front and rear chambers, the forward movement of the heating cylinder with respect to the ram forcing molten moulding material from said front chamber through the nozzle and into the fixed mould simultaneously with the passage of raw material into said inlet, and the return movement of the cylinder forcing pre-heated raw material from the rear chamber into the front chamber.

References Cited in the file of this patent

UNITED STATES PATENTS 2,422,990    Spanier  ---------------- June 24, 1947
2,680,883    Ashbaugh  -------------- June 15, 1954